(12) United States Patent
Karino et al.

(10) Patent No.: US 8,880,911 B2
(45) Date of Patent: Nov. 4, 2014

(54) POWER SUPPLY APPARATUS

(75) Inventors: Kenichi Karino, Suntou-gun (JP);
Nobuyuki Uchiyama, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 447 days.

(21) Appl. No.: 13/226,401

(22) Filed: Sep. 6, 2011

(65) Prior Publication Data
US 2012/0080947 A1      Apr. 5, 2012

(30) Foreign Application Priority Data

Sep. 30, 2010   (JP) ................ 2010-221926

(51) Int. Cl.
*G06F 1/00*     (2006.01)
*G06F 11/30*    (2006.01)
*H02J 1/14*     (2006.01)
*H02M 1/32*     (2007.01)

(52) U.S. Cl.
CPC ............ *H02J 1/14* (2013.01); *H02M 2001/322* (2013.01)
USPC ......................................... 713/300; 713/340

(58) Field of Classification Search
USPC ............... 363/89; 323/282–285; 320/166; 713/300, 340
See application file for complete search history.

(56) References Cited

U.S. PATENT DOCUMENTS 5,572,735  A  * 11/1996  Tanikawa ............... 713/300
7,761,718  B2 *  7/2010  Yasuo et al. ............ 713/300
2008/0297820  A1   12/2008  Karino et al.
2010/0166449  A1    7/2010  Hong
2010/0177539  A1 *  7/2010  Lu ........................... 363/39

FOREIGN PATENT DOCUMENTS

| JP | 2000-184718 A | 6/2000 |
| JP | 2001-45756 A  | 2/2001 |
| JP | 2001-166645 A | 6/2001 |
| JP | 2001-188442 A | 7/2001 |
| JP | 2002-258687 A | 9/2002 |
| JP | 2005-323194 A | 11/2005 |
| JP | 2007-288995 A | 11/2007 |

OTHER PUBLICATIONS

Chinese Office Action dated Nov. 25, 2013 issue in corresponding Chinese Patent Application No. 201110296152.7.

* cited by examiner

*Primary Examiner* — Jue Zhang
(74) *Attorney, Agent, or Firm* — Fitzpatrick, Cella, Harper & Scinto

(57) ABSTRACT

The power supply includes an output unit that converts a DC voltage and outputs the DC voltage; a capacitor that stabilizes the DC voltage output from the output unit, the power supply being able to be operated in a power saving mode in which a power consumption is reduced by stopping a whole or part of an operation of a load operated by the DC voltage output from the output unit; a detection unit that detects that a power is cut off; a discharging load that discharges the capacitor; and a control unit that performs control so as to operate the charging load when the detection unit detects that the power is cut off during the operation in the power saving mode.

15 Claims, 8 Drawing Sheets

POWER SUPPLY APPARATUS

BACKGROUND OF THE INVENTION

1. Field of the Invention

The present invention relates to a power supply apparatus, particularly to a power supply apparatus that implements a power saving mode.

2. Description of the Related Art

Recently, electric power saving of electronic apparatus advances. For example, there has been proposed a configuration, in which an image forming apparatus such as a printer, a copying machine, and a facsimile machine transfers a power saving mode to suppress a power consumption as much as possible in a standby state that image formation is not performed (for example, see Japanese Patent Application Laid-Open No. 2001-188442). In the power saving mode of the image forming apparatus, a power is cut off to a unit that is not necessary to be operated when the image formation is not performed. For example, the power is cut off to a motor control unit that controls a motor to convey a recording sheet. A control CPU switches an output signal to a low level to put a switch element connected through a transistor into a non-conduction state, thereby cutting off the power to the motor control unit. Therefore, the power consumed by the motor control unit is reduced. The power is cut off to units that are not necessary to be operated in addition to the motor control unit. Thus, when the image formation is not performed, the power saving mode can be implemented by cutting off the power to the unit that is not necessary to be operated.

However, in the related art, the following problems are generated in the state of the power saving mode, in the case where a cord is removed from an outlet of the apparatus or in the case where a power switch is turned off. Few charges accumulated in a smoothing capacitor provided in a power supply output of each of plural DC/DC converters in a power supply apparatus are discharged, and it takes a long time to decrease a voltage. With an increase in output capacity of the power supply because of high functionality of the apparatus, a capacitance of the smoothing capacitor tends to increase. On the other hand, because recently the power consumption is reduced to a value of 1 W or less during the power saving mode, for example, several seconds to tens seconds are required to discharge the smoothing capacitor in the image forming apparatus. In the power saving mode, when the apparatus is unplugged or when the power switch is turned off, it takes a long time to decrease the voltage of the power supply output, which results in the following problems.

A first problem in the case where an overvoltage protection circuit including an operational amplifier is used in the power supply apparatus will be described. The operational amplifier outputs a low-level signal when a voltage (+) at a non-inverting input terminal becomes smaller than an inverting input voltage V (−), and the low-level signal is input to an insulation type DC/DC converter to stop an oscillation of the insulation type DC/DC converter (see FIG. 3). In the state that the image forming apparatus transfers to the power saving mode, when the power is cut off from the power supply such that the image forming apparatus is unplugged or such that the power switch is turned off, a voltage drop at the inverting input terminal V(−) (=V3−Vf) is delayed compared with a voltage drop at the non-inverting input terminal V(+). FIG. 8 is a graph in which a horizontal axis indicates an elapsed time while a vertical axis indicates a power supply voltage and an output of the operational amplifier. At this point, V1 is a voltage in which a DC voltage obtained by rectifying a commercial power source is stepped down by the insulation type DC/DC converter, V3 is a voltage in which the voltage V1 is stepped down by a non-insulation type DC/DC converter, and Vf is a forward voltage of a diode provided in an overvoltage protection circuit. As illustrated in FIG. 8, a relationship of V(+) <V(−) holds although an overvoltage state is not generated in the power supply of the voltage V3 during the voltage drop, and the output of the operational amplifier becomes the low level to forcedly stop the oscillation of the insulation type DC/DC converter. Even if the apparatus is powered on again by plugging the apparatus by inserting a cord into the outlet or by turning on the power switch, the oscillation of the insulation type DC/DC converter cannot be started until the discharge of the voltage V3 is completed (start-up impossible time). The start-up impossible time becomes a system-down time for a user, which degrades usability.

A second problem is generated in a configuration in which the power consumption is suppressed by partly stopping a function of a control unit while the power is supplied to the control unit when the power saving mode is set. In the configuration, when the apparatus is unplugged during the power saving mode or when the power switch is turned off during the power saving mode, it takes a long time to discharge the smoothing capacitor similarly to the first problem. Therefore, an additional memory can be inserted and removed in the activation state although the power of apparatus is turned off, and possibly the additional memory and the control unit may be broken. Additionally, the insulation type DC/DC converter continues the operation until a charge voltage of the smoothing capacitor becomes a predetermined voltage or less. Therefore, even if the apparatus is unplugged while the power saving mode is set in the apparatus, or even if the power switch of the apparatus is turned off while the power saving mode is set in the apparatus, it takes a long time to stop the operation, and therefore the wasted operation is possibly generated.

In view of the foregoing, the invention enables the capacitor to be rapidly discharged even if the power is cut off from the power supply during the power saving mode.

SUMMARY OF THE INVENTION

A power supply apparatus according to an embodiment of the present invention includes: an output unit that converts a DC voltage input to a primary side and outputs the DC voltage from a secondary side; a capacitor that stabilizes the secondary-side DC voltage output from the output unit, the power supply apparatus being able to be operated in a power saving mode in which a power consumption is reduced by stopping a whole or part of an operation of a load operated by the secondary-side DC voltage output from the output unit; a detection unit that detects that a power is cut off from a commercial power source; a discharging load that discharges the capacitor; and a control unit that performs control so as to operate the charging load when the detection unit detects that the power is cut off during the operation in the power saving mode.

Further features of the present invention will become apparent from the following description of exemplary embodiments with reference to the attached drawings.

DESCRIPTION OF THE EMBODIMENTS

Configurations and operations of the present invention will now be described below. The following embodiments are described by way of example, and the technical scope of the invention is not limited to the embodiments. Hereinafter, preferred embodiments of the present invention will now be described in detail in accordance with the accompanying drawings.

A first embodiment will be described below.

(Schematic Configuration of Power Supply Apparatus)

Figure 1:
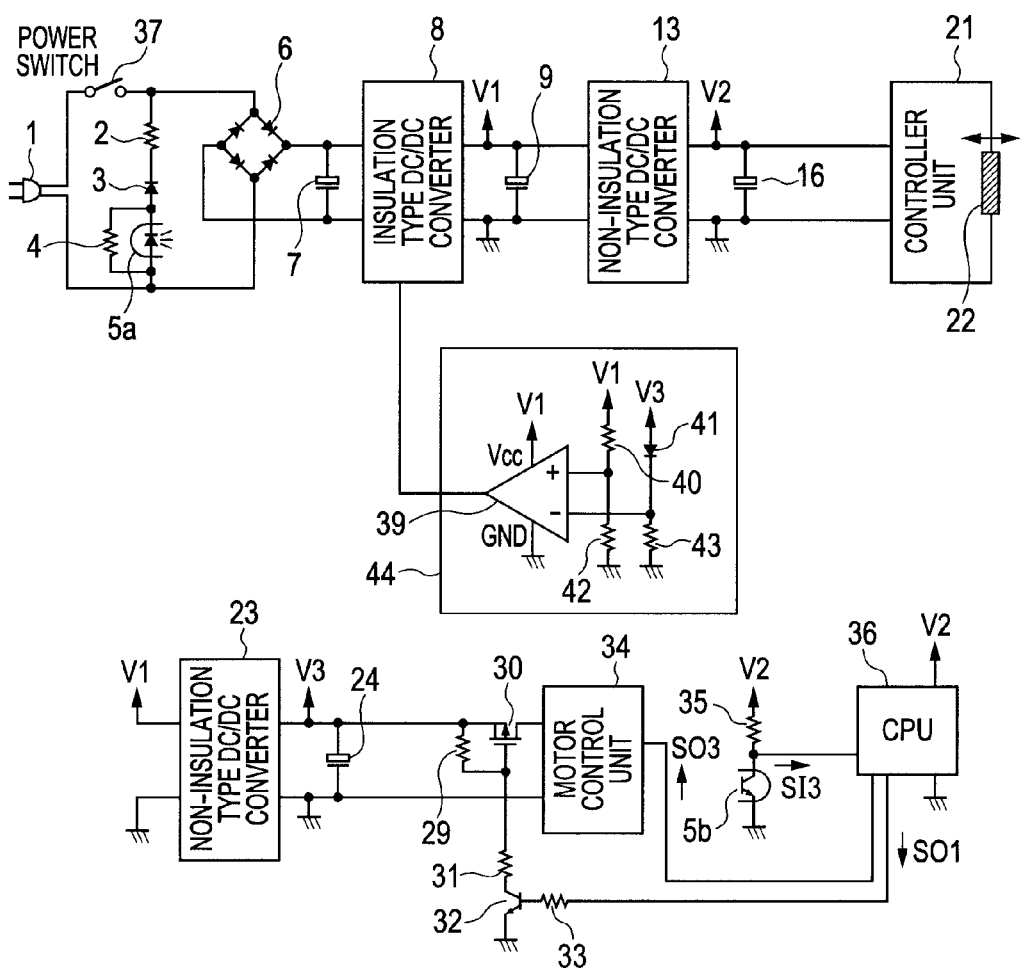
FIG. 1 illustrates a schematic configuration of a power supply apparatus according to a first embodiment.

FIG. 1 is a view illustrating a schematic configuration of a power supply apparatus according to a first embodiment for an image forming apparatus. In the power supply apparatus of the first embodiment, an AC voltage is supplied from a commercial power source (not illustrated) through an outlet 1, and the AC voltage is rectified into a DC voltage by a rectifying diode bridge 6 and a smoothing capacitor 7. An insulation type DC/DC converter 8 (output unit) uses the rectified DC voltage as an input to ensure insulation with a primary-side circuit, and outputs a stepped-down DC voltage V1 on a secondary side. Non-insulation type DC/DC converters 13 and 23 (output units) output secondary-side DC voltages V2 and V3 that are further stepped down from the primary-side DC voltage V1. In order to stabilize output voltages, smoothing capacitors 9, 16, and 24 are provided in outputs of the DC voltages V1, V2, and V3, and capacitances of the smoothing capacitors 9, 16, and 24 are set according to load capacitances. Although each unit necessary for image formation is provided in the image forming apparatus, the detailed description of each unit is not made here. In the first embodiment, only a control CPU 36 (simply designated by CPU), a control unit 21 (load), and a motor control unit 34 (load) are illustrated in FIG. 1.

The control CPU 36 uses the DC voltage V2 as an operating power supply (hereinafter also referred to as a power supply V2) to control the whole of the image forming apparatus. In order to control the whole of the image forming apparatus, the control CPU 36 has functions of receiving an input signal from each unit and transmitting an output signal to each unit. The power source V2 is fed to the control unit 21 to process image data transmitted from a PC (Personal Computer: not illustrated) connected to the image forming apparatus. In order to enhance an image processing speed, a user can externally attach an additional memory 22 at user's option. The motor control unit 34 controls a motor (not illustrated) that conveys a recording sheet in the image forming apparatus.

The motor control unit 34 uses the DC voltage V3 as a driving power supply (hereinafter also referred to as a power supply V3), and the control CPU 36 controls the power supply V3 through a switch element 32. The control CPU 36 outputs a signal SO3 to the motor control unit 34 to control a rotation speed of the motor control unit 34. In order to cut off the power to the motor control unit 34, the control CPU 36 sets an output signal SO1 to a low level to turn off a transistor 32 (switching element). The control CPU 36 puts the switch element 30, which is of a P-channel FET connected to a transistor 32, into a non-conduction state. Therefore, the whole operation of the motor control unit 34 is stopped. The numerals 29, 31, and 33 designate resistors. Therefore, the power consumed by the motor control unit 34 is reduced. When the image formation is not performed, the power supply apparatus of the first embodiment can be operated in a power saving mode to reduce the power consumption by cutting off the power to the unit that is not necessary to be operated. For example, the control CPU 36 includes a timer, a time since an image formation operation is ended is measured with the timer, and the power supply apparatus transfers to the power saving mode when a next job is not received even if a predetermined time elapses.

(Overvoltage Protection Circuit)

FIG. 1 illustrates an example of an overvoltage protection circuit 44 including an operational amplifier 39 of the first embodiment. The overvoltage protection circuit 44 prevents the non-insulation type DC/DC converter 23 from going out of control and prevents V3 from maintaining the overvoltage state. As to a function of the overvoltage protection circuit 44, the overvoltage state is improved by stopping the operation of the insulation type DC/DC converter 8 that provides an input voltage of the non-insulation type DC/DC converter 23. In the power supply configuration of FIG. 1, V1 having the most accurate output voltage is set in a reference voltage to monitor a voltage at V3 located downstream of V1. The voltage V1 is divided by resistors 40 and 42 and input to the non-inverting input terminal V(+) of the operational amplifier 39, and the voltage in which a forward voltage Vf of a diode 41 is subtracted from V3 is input to the inverting input terminal V(−). A resistor 43 is a current-limiting resistor. In the case where V1 and V3 are normally output, in the relationship of V(+)>V(−) holds between the non-inverting input terminal V(+) and the inverting input terminal V(−) of the operational amplifier 39, and the operational amplifier 39 outputs a high-level signal to the insulation type DC/DC converter 8. On the other hand, in the case where the non-insulation type DC/DC converter 23 goes out of control to raise the voltage of V3, the input relationship of the operational amplifier 39 becomes V(+)<V(−). At this point, the output of the operational amplifier 39 becomes the low level (hereinafter referred to as an Lo signal), and the Lo signal is input to the insulation type DC/DC converter 8 to stop the oscillation of the insulation type DC/DC converter 8. The diode 41 is inserted in order to prevent the charge from flowing back from V1 to V3. Thus, the overvoltage protection circuit can simply be configured at low cost.

Figure 8:
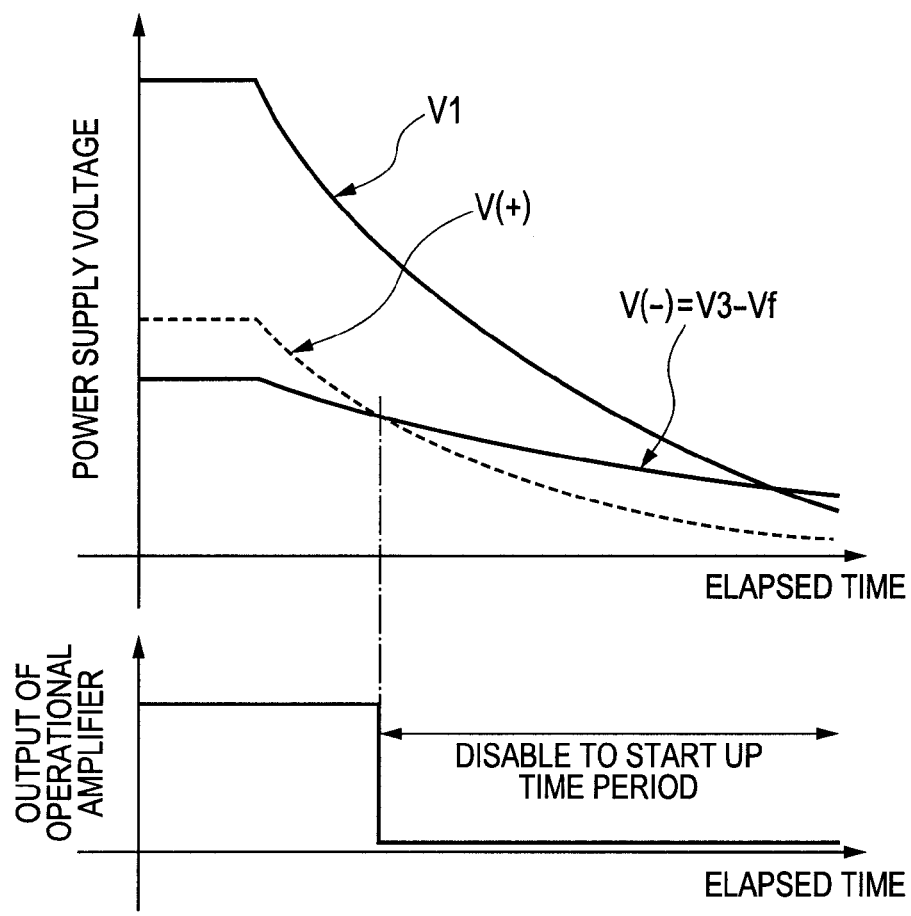
FIG. 8 illustrates an operating waveform of an overvoltage protection circuit in a power supply apparatus of the related art.

While the image forming apparatus transfers to the power saving mode, when the cord is removed from the outlet 1 or when the power switch 37 is turned off, because the power consumption of V3 is substantially zero, it takes a long time to discharge the smoothing capacitor 24. It is assumed that the smoothing capacitor 24 has the capacitance of 100 μF, and it is assumed that impedance of 100 kΩ exists between the power supply V3 and a ground in the power saving mode. At this point, a discharge time constant becomes 10 seconds. On the other hand, V1 is converted into V2 by the non-insulation type DC/DC converter 13, and the charge of V2 is consumed by the control unit 21 and the control CPU 36, so that V1 is decreased faster than V3. Therefore, as illustrated in FIG. 8, the inverting input terminal V(−) is slower than the non-inverting input terminal V(+) in the voltage drop, and the relationship of V(+)<V(−) holds although the overvoltage state of the power supply V3 is not generated during the voltage drop. Therefore, the output of the operational amplifier 39 becomes the low level to forcedly stop the oscillation of the insulation type DC/DC converter 8. Even if the apparatus is powered on again by inserting the cord into the outlet 1 or by turning on the power switch 37, the oscillation of the insulation type DC/DC converter 8 cannot be started until the discharge of V3 is completed.

(Blackout Detection Circuit)

Figure 2:
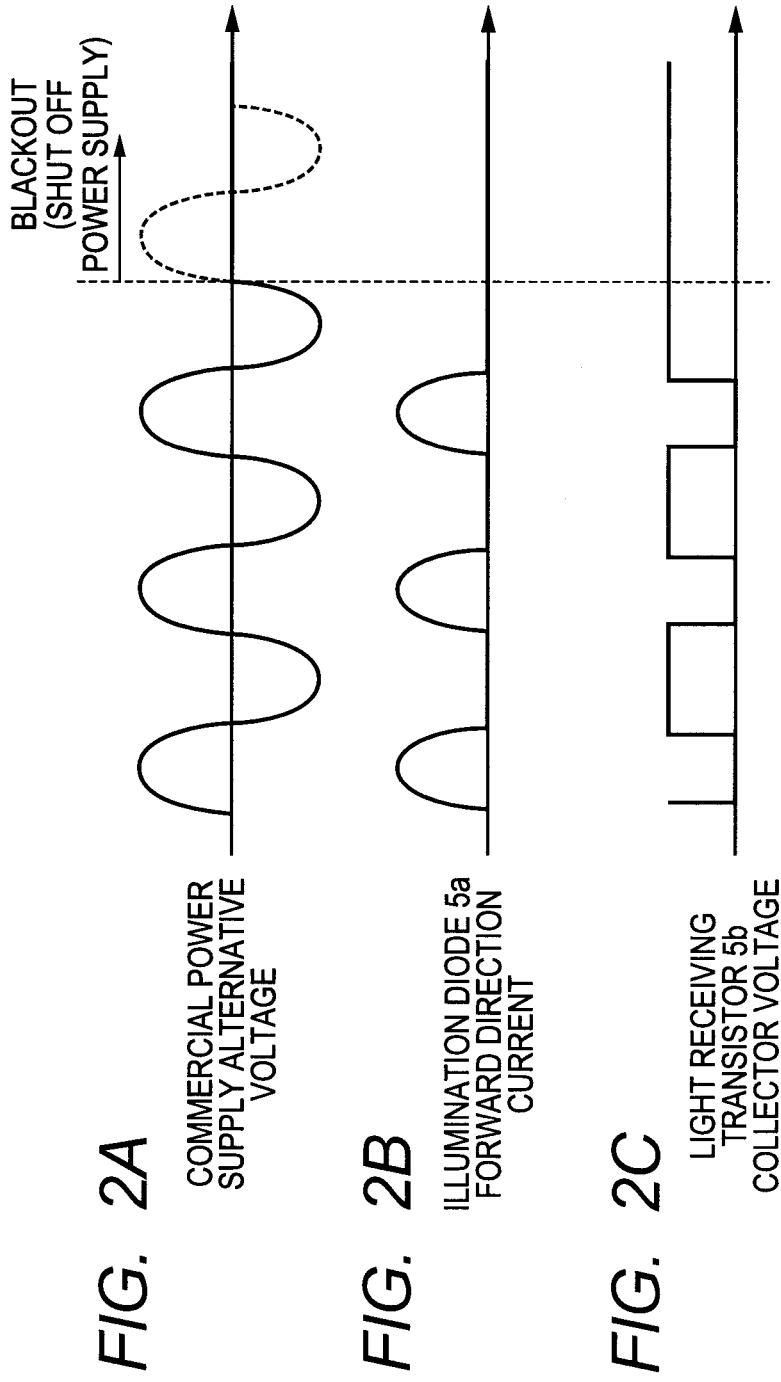
FIGS. 2A, 2B, and 2C illustrate waveforms of a current and a voltage when a blackout detection circuit of the first embodiment is operated.

In the first embodiment, a blackout is detected with a frequency sensing circuit that is used to control a fixing device of the image forming apparatus. That is, the frequency sensing circuit acts as the blackout detection circuit (detection unit). The frequency sensing circuit will be described below with reference to FIG. 1. A light emitting diode (light emitting element) 5a of a photo coupler, a rectifying diode 3, and a current limiting resistor 2 are inserted between two patterns (AC lines) connected to the outlet 1. Because the current is passed only toward an orientation of the rectifying diode 3 with respect to the AC voltage of the commercial power source input through the outlet 1 as illustrated in FIG. 2A, a forward current is passed through the light emitting diode 5a in synchronization with the AC voltage as illustrated in FIG. 2B, and the light emitting diode 5a emits the light. On the other hand, a collector terminal of a light receiving transistor (light receiving element) 5b of the photo coupler is pulled up to the power supply V2 by a resistor 35 while connected to the control CPU 36, and a rectangular waveform pulse is generated by receiving the light as illustrated in FIG. 2C. The light receiving transistor 5b of the photo coupler outputs the rectangular waveform pulse (pulse signal) as a signal SI3 to the control CPU 36. The rectangular waveform pulse is input as the signal SI3 to the control CPU 36, which allows the control CPU 36 to be synchronized with the frequency sensing or the AC voltage waveform of the commercial power source. In the case where the light receiving transistor 5b of the photo coupler does not output the pulse signal for a predetermined time, namely, in the case where the pulse signal is not input to the control CPU 36 for at least a constant time (see a broken line of FIG. 2A), the control CPU 36 can determine that the blackout is generated, namely, the power is cut off. The control CPU 36 determines that the power is cut off in the case where a trailing edge of a collector voltage of the light receiving transistor 5b cannot be detected for a predetermined time since the rising edge using a counter. Alternatively, for example, a timer may be used instead of the counter. The control unit 21 may determine whether the power is cut off.

(Control of Power-Off Processing)

A control flow of power-off processing of the first embodiment will be described with reference to FIG. 3. When starting the control by power activation of the apparatus, the control CPU 36 determines whether the apparatus is in the power saving mode (Step 1 (hereinafter referred to as S1). When it is determined that the apparatus is in the power saving mode, the control CPU 36 sets the output signal SO1 (SO1 signal) to the low level (Lo output) to put the switch element 30 into an off-state in S2. Therefore, the control CPU 36 can stop the power to the motor control unit 34 to reduce the power consumption. In S3, the control CPU 36 determines whether the apparatus is deplugged or whether the power switch 37 is turned off, namely, whether the apparatus is in the power-feeding stop state. Specifically, the control CPU 36 determines that the apparatus is in the power-feeding stop state in the case where the pulse is not detected for a constant time in the input signal SI3 from the frequency sensing circuit. When the apparatus is in the power-feeding stop state, the control CPU 36 sets the output signal SO1 to the high level (Hi output) to put the switch element 30 into an on-state in S4. Therefore, the control CPU 36 starts the power feeding to the motor control unit 34 (discharging load). The control CPU 36 determines that the apparatus is in the power-feeding stop state during the power saving mode, and the control CPU 36 starts the power feeding to the motor control unit 34, which allows the power supply V3 to rapidly perform the voltage drop.

Figure 4:
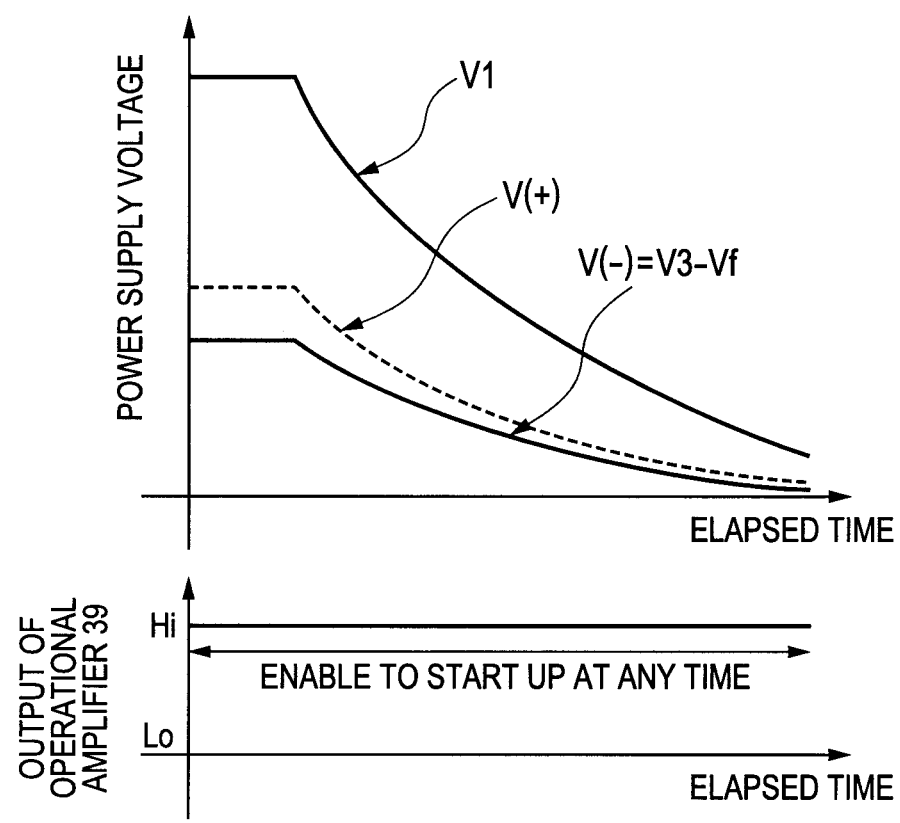
FIG. 4 illustrates an operating waveform of an overvoltage protection circuit in the power supply apparatus of the first embodiment.

In the case where the power-feeding stop state is sensed during the power saving mode, the power feeding is resumed to the unit (in the first embodiment, for example, the motor control unit 34) to which the power feeding is stopped in order to reduce the power consumption, which allows the power supply voltage V3 to drop rapidly. As illustrated in FIG. 4, the voltage at the inverting input terminal V(−) of the operational amplifier 39 of the overvoltage protection circuit 44 can rapidly drop so as to be always lower than the voltage at the non-inverting input terminal V(+). Accordingly, the output of the operational amplifier 39 is maintained at the high level, and the state that the power supply can always be re-started (enable to start up at any time) can be retained. FIG. 4 is a graph in which the horizontal axis indicates the elapsed time while the vertical axis indicates the power supply voltage and the output of the operational amplifier 39.

According to the first embodiment, the smoothing capacitor can rapidly be discharged even if the power is cut off from the power supply during the power saving mode. Accordingly, the power saving mode can be achieved without degrading the usability.

A second embodiment will be described below.

Figure 5A:
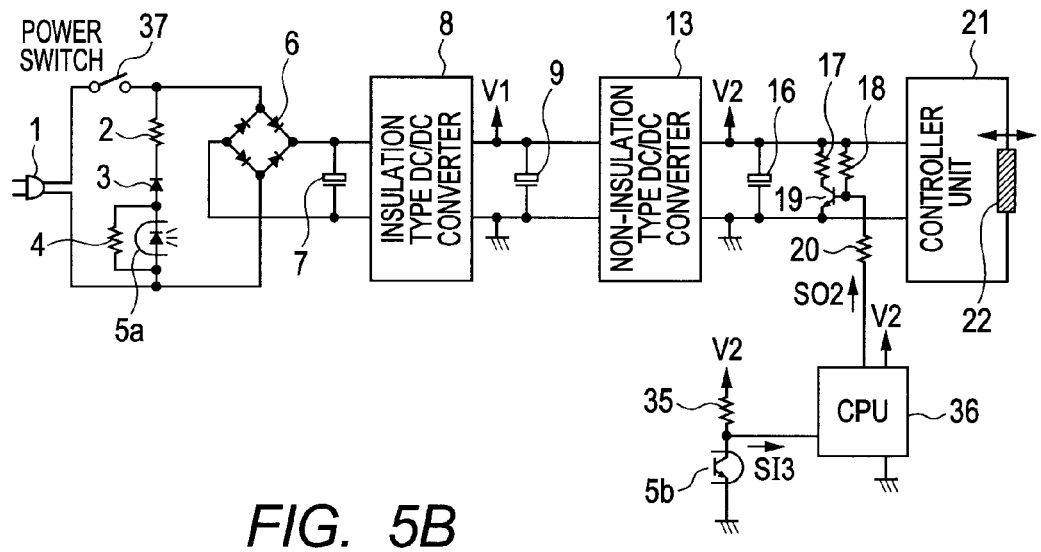
FIG. 5A illustrates a schematic configuration of a power supply apparatus according to a second embodiment.

FIG. 5A illustrates a schematic configuration of a power supply apparatus according to a second embodiment. The same configuration as the first embodiment is designated by the same numeral, and the description will not be repeated here. In the second embodiment, the case where the function in the control unit 21 is stopped in order to achieve the power saving mode will be described.

(Control Unit)

Figure 5B:
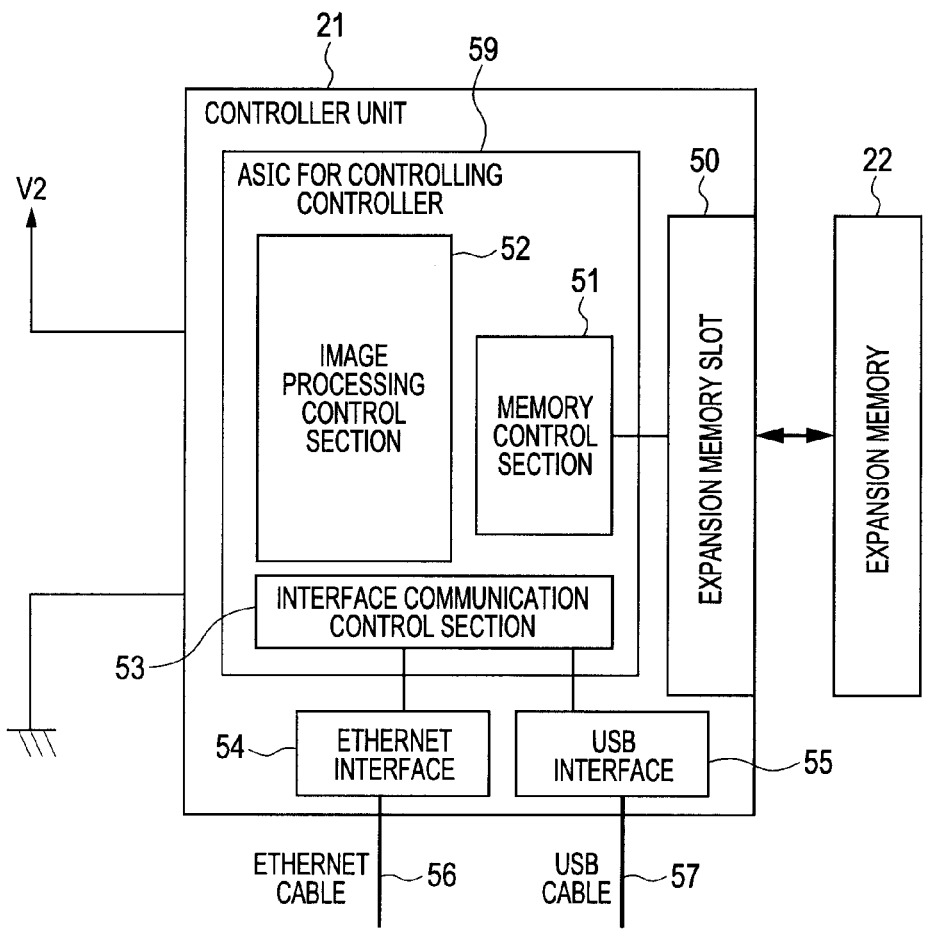
FIG. 5B illustrates a schematic configuration of a control unit.

FIG. 5B is a block diagram illustrating an inside of the control unit 21. The control unit 21 includes a control section control ASIC 59, an additional memory slot 50, an Ethernet (registered trademark) interface 54, and a USB interface 55. In the second embodiment, although the control unit 21 includes other components, the descriptions of the components are not made here. The Ethernet interface 54 and the USB interface 55 are connected to an Ethernet (registered trademark) cable 56 and a USB cable 57, respectively, and the Ethernet interface 54 and the USB interface 55 are connected to a network (not illustrated) and a PC (Personal Computer) of each user. The additional memory slot 50 is provided in order that the user externally attaches the additional memory 22. Various interfaces and the memory slot are controlled by the control section control ASIC 59. Functions such as an interface communication control section 53, a memory control section 51, and an image processing control section 52 are incorporated in the control section control ASIC 59.

The power supply V2 always supplies the power to the control unit 21. However, in order to achieve the power saving mode, all the functions, except a part, of the control section control ASIC 59 can be stopped to reduce the power consumed by the control unit 21. For example, in the image processing control section 52 and the memory control section 51 in the control section control ASIC 59, supply of a control clock is halted to completely stop the functions in the power saving mode. The control unit 21 resumes the halted functions to perform the image formation in the case where a print request signal is output from the user through the interface communication control section 53. Thus, the control unit 21 of the second embodiment can suppress the power consumption by halting the internal functions thereof, even if the power supply always supplies the power to the control unit 21. When the apparatus is deplugged by pulling out a cord from the outlet 1 or the power switch 37 is turned off while the internal functions of the control unit 21 are halted, the voltage drop of V2 is lengthened similarly to the first embodiment. Therefore, when the additional memory 22 is inserted or removed during the voltage drop, the additional memory 22 and the control unit 21 are possibly broken.

In the second embodiment, as illustrated in FIG. 5A, a transistor 19 (switching element) and a resistor 17 are inserted in series between the power supply V2 and the ground potential. A base terminal of the transistor 19 is pulled up to the potential V2 by a pull-up resistor 18 and connected to the control CPU 36 through a base resistor 20. The pull-up resistor 18 has a resistance sufficiently larger than that of a resistor 17, and the pull-up resistor 18 has no influence on a target power value in the power saving mode even if the control CPU 36 sets the signal SO2 to the low level (Lo) to pass the current through the pull-up resistor 18. For example, letting V2=3.3 V, resistor 17=100Ω, and pull-up resistor 18=10 kΩ), the maximum power consumed by the pull-up resistor 18 is about 1 mW, which can be ignored when the target power consumption value in the power saving mode is set to 1 W.

(Control CPU)

The control CPU 36 of the second embodiment has a power-on reset function. In the power-on reset function, a reset state of the control CPU 36 is released when the voltage at the power supply V2 exceeds a constant value (reset voltage), and the control CPU 36 is set in the reset state when the voltage at the power supply V2 is determined to be lower than the reset voltage. In the case where the control CPU becomes the reset state, the function of the control CPU 36 is stopped and all the output terminals are retained in a high-impedance state. Therefore, the power consumption of the control CPU 36 is reduced.

(Control of Power-Off Processing)

Figure 6:
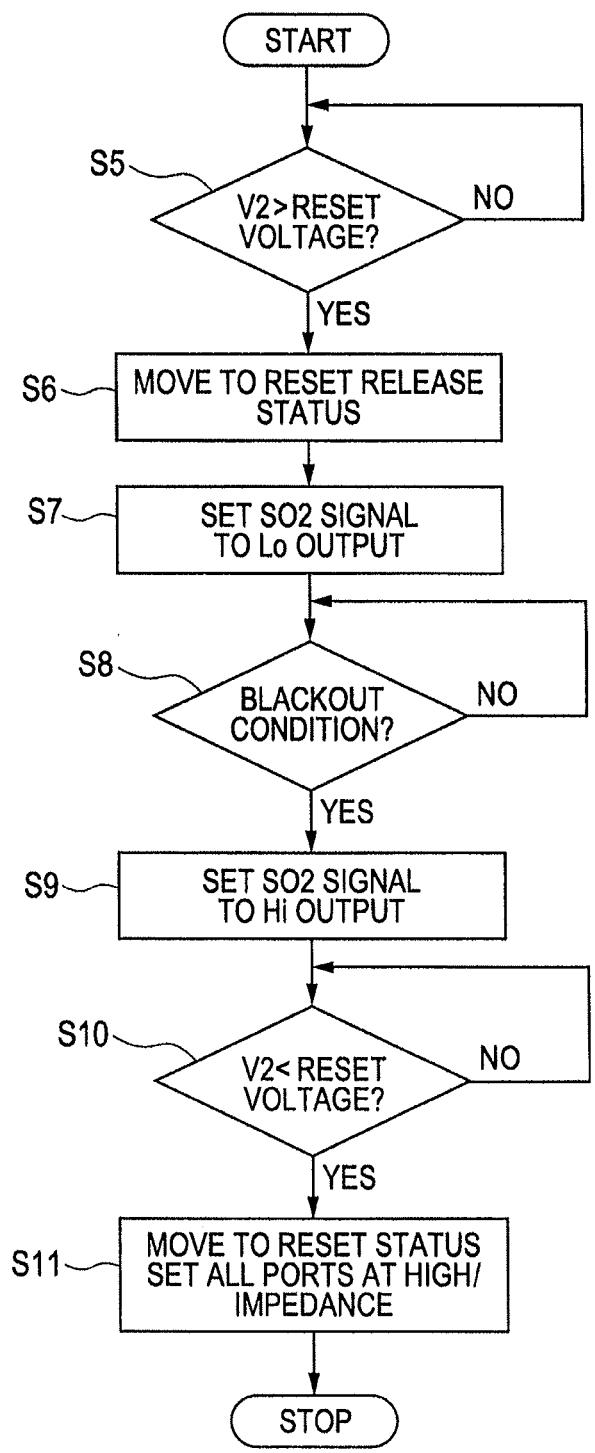
FIG. 6 is a flowchart illustrating control of the power supply apparatus of the second embodiment.

The control of power-off processing of the second embodiment will be described with reference to FIG. 6. In S5, the control CPU 36 determines whether V2 that is of the power supply voltage of the control CPU 36 is more than the reset voltage. When V2 is lower than the reset voltage, the control CPU 36 retains the reset state, and all the output terminals are retained in the high-impedance state. Accordingly, an initial state of the transistor 19 becomes the on-state. When V2 is more than the reset voltage, the control CPU 36 transfers to a reset releasing state in S6, and the control CPU 36 sets the SO2 signal to the low level (Lo output) in S7. Therefore, the transistor 19 becomes the off-state, and the power consumption of the resistor 17 becomes zero. In S8, the control CPU 36 determines whether the apparatus is in the power-feeding stop state while deplugged by pulling off a cord from the outlet 1. The determination in S8 is similar to that of the first embodiment (S3 in FIG. 3). When the apparatus is in the power-feeding stop state, the control CPU 36 sets the SO2 signal to the high level (Hi output). Accordingly, the transistor 19 becomes the on-state to form a discharge route of the smoothing capacitor 16 through the resistor 17 (discharging load). Assuming that the smoothing capacitor 16 has the capacitance of 1000 μF and the resistor 17 has a resistance value of 100Ω, the discharge time constant becomes 0.1 s, and the voltage at the power supply V2 drops rapidly. Accordingly, the activation insertion and removal can be avoided even if the user who deplugs the apparatus inserts or removes the additional memory 22. In S10, the control CPU 36 determines whether V2 is lower than the reset voltage. When V2 is lower than the reset voltage, the control CPU 36 transfers to the reset state to set all the input/output ports of the control CPU 36 to the high-impedance state in S11. In the second embodiment, the additional memory that is of the option is inserted and removed. Alternatively another option may be inserted and removed. When the voltage at the power supply V2 is lower than the reset voltage of the control CPU 36 during the voltage drop of V2, the output port of the SO2 signal of the control CPU 36 transfers from the high-level output state to the high-impedance state. However, because the pull-up resistor 18 exists, the on-state of the transistor 19 is continued, and V2 drops continuously and rapidly.

One of the features of the second embodiment is that a load element (transistor 19) that is in the normally on-state is inserted between the output of the power supply V2 and the ground. Therefore, the discharge route can be formed, even if the control CPU 36 cannot perform the control because the control CPU 36 becomes the reset state by the voltage drop of the power supply V2.

According to the second embodiment, the smoothing capacitor can rapidly be discharged even if the power is cut off from the power supply during the power saving mode. Therefore, even if the user inserts or removes the option device such as the additional memory immediately after the power-off, the power saving mode can be achieved with no risk of breaking the option device or the apparatus main body.

A third embodiment will be described below.

Figure 7A:
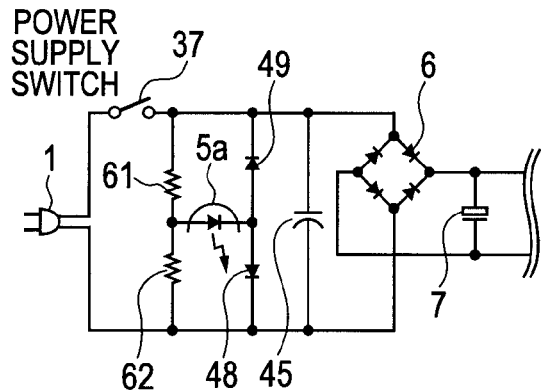
FIG. 7A illustrates a configuration of a main part of a power supply apparatus according to a third embodiment.

FIG. 7A illustrates a schematic configuration of a main part of a power supply apparatus according to a third embodiment, and only the main part different from that of the first embodiment is illustrated in FIG. 7A. A rear stage section of a smoothing capacitor 7 having the same configuration as the first embodiment is omitted in FIG. 7A, and the description is made using the same numeral as that of FIG. 1. An X-capacitor 45 is a normal-mode noise reduction capacitor that is connected between the lines of the commercial power source. Discharge resistors 61 and 62 discharge the charge accumulated in the X-capacitor 45 when the apparatus is deplugged. That the voltage is 37% or less with respect to the initial value after one second since the apparatus is deplugged is defined by law. Therefore, it is necessary that resistance values of the discharge resistors 61 and 62 be set according to a capacitance of the X-capacitor 45. In the related art, the discharge of the X-capacitor 45 is constructed only by the resistors 61 and 62. On the other hand, in the third embodiment, the light emitting diode 5a of the photo coupler and the diodes 48 and 49 are added in addition to the discharge resistors 61 and 62.

(Blackout Detection Circuit)

The light emitting diode 5a of the photo coupler is used to detect the insertion or removal of the cord from the outlet 1 or the turn-off of the power switch 37, and the diodes 48 and 49 are used to alternately pass the alternating current. In a normal operation, when the side of the power switch 37 of the commercial power source has a positive polarity, the current is passed to the outlet 1 through the discharge resistor 61, the light emitting diode 5a of the photo coupler, and the diode 48. On the other hand, when the side of the power switch 37 of the commercial power source has a negative polarity, the current is passed to the outlet 1 through the discharge resistor 62, the light emitting diode 5a of the photo coupler, and the diode 49. When the X-capacitor 45 is discharged by removing the cord from the outlet 1, the current is passed in the similar route according to the polarity of the charge accumulated in the X-capacitor 45. In the third embodiment, because the current is passed through only one of the discharge resistors 61 and 62, it is necessary that a discharge resistance value be set double that of the related art when a discharge time of the X-capacitor 45 is set equal to that of the related art. At this point, the third embodiment is equal to the related art in the total power consumption of the discharge resistors. That is, the originally-consumed discharge current of the X-capacitor 45 is used in sensing the blackout of the AC input voltage, whereby the blackout sensing of the AC input voltage is performed while the power consumption is not added compared with the related art.

Figure 7B:
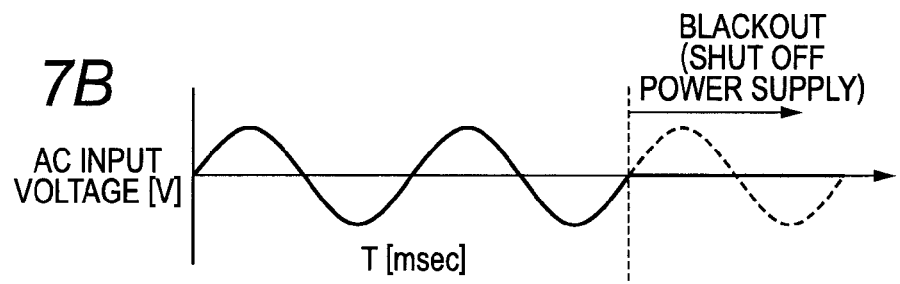
FIGS. 7B, 7C, and 7D illustrate voltage waveforms when the power supply apparatus of the third embodiment is operated.
Figure 7C:
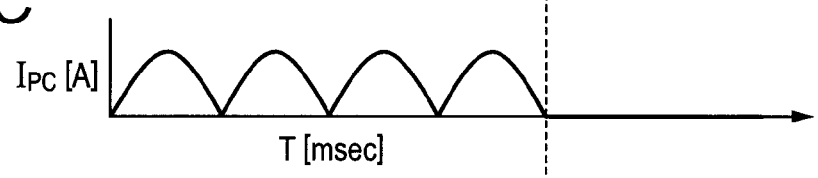
Figure 7D:
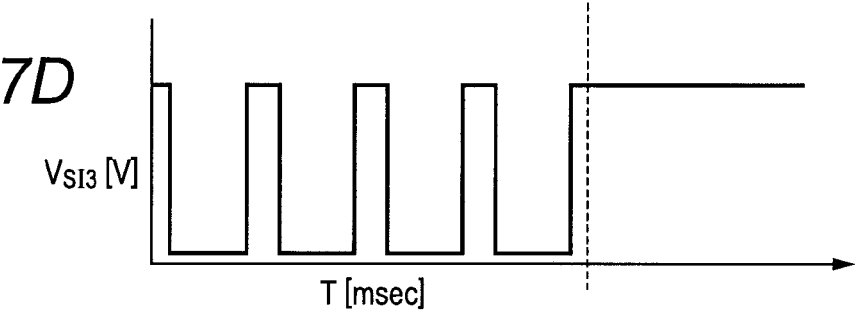

In the configuration of the third embodiment, a current (IPC) passed through the light emitting diode 5a of the photo coupler becomes similar to the waveform in which the AC input voltage (FIG. 7B) is rectified as illustrated in FIG. 7C. In FIG. 7C, the horizontal axis indicates the time, and the vertical axis indicates the voltage. On the other hand, the light receiving transistor 5b of the photo coupler is pulled up at the same power supply voltage V2 as Vcc of the control CPU 36 by the resistor 35, and the collector of the light receiving transistor 5b is connected to the input port of the control CPU 36 (see FIG. 1). When the current is passed through the light emitting diode 5a of the photo coupler as illustrated in FIG. 7C, a pulse waveform (VSI3) is generated in the collector of the light receiving transistor 5b as illustrated in FIG. 7D. At this point, when the cord is removed from the outlet 1 during the power saving mode, or when the power switch 37 is turned off during the power saving mode, the current is not passed through the light emitting diode 5a of the photo coupler. Therefore, the light receiving transistor 5b is always put into the off-state, and the high-level signal S13 is input to the port of the control CPU 36. Similarly to the first embodiment, the control CPU 36 monitors whether the pulse waveform is input, whereby the control CPU 36 can detect the cut-off of the power, namely, the blackout due to the removal of the cord from the outlet 1 or the turn-off of the power switch 37.

Figure 3:
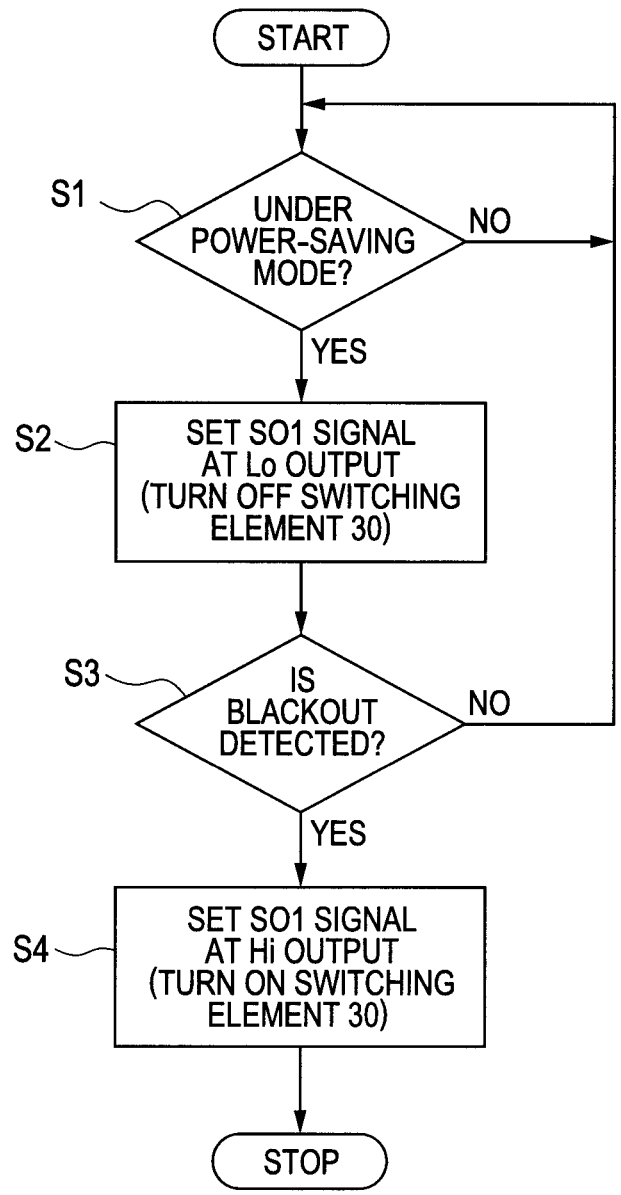
FIG. 3 is a flowchart illustrating control of the power supply apparatus of the first embodiment.

The processing of the control CPU 36 in detecting the removal of the cord from the outlet 1 or the turn-off of the power switch 37 is identical to the flowchart of FIG. 3 of the first embodiment, so that the description will not be repeated here. Therefore, the power supply voltage V3 can rapidly drop.

As described above, when the blackout state is sensed during the power saving mode, or when the blackout state is sensed in a period during which the apparatus returns from the power saving mode to the normal mode, the power supply voltage V3 can rapidly drop in the third embodiment. Specifically, for example, the power supply voltage V3 can rapidly drop without increasing the power consumption by resuming the power feeding to the motor control unit 34 to which the power feeding is halted in order to reduce the power consumption. Similarly to the first embodiment, as illustrated in FIG. 5, the voltage at the inverting input terminal V(−) of the operational amplifier 39 can rapidly drop so as to be always lower than the voltage at the non-inverting input terminal V(+). Therefore, the output of the operational amplifier 39 of the overvoltage protection circuit 44 is maintained at the high level, and the state that the power supply can always be re-started can be retained. In the third embodiment, similarly to the second embodiment, the operation of the insulation type DC/DC converter 8 can rapidly be stopped to avoid the activation insertion and removal of the additional memory 22 by the user. It is not necessary to provide the dedicated discharge resistor, so that the total power consumption can further be reduced. Thus, the smoothing capacitor can rapidly be discharged even if the power is cut off from the power supply during the power saving mode. Accordingly, the power saving mode can be achieved without degrading the usability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-221926, filed Sep. 30, 2010, which is hereby incorporated by reference herein in its entirety.

What is claimed is:

1. A power supply apparatus comprising:
    an output unit that converts a first DC voltage input into a second DC voltage lower than the first DC voltage, and outputs the second DC voltage;
    a capacitor that smoothes the second DC voltage as a smoothed second DC voltage;
    a detection unit that detects that a power is cut off from a commercial power source; and
    a control unit that is capable of setting a mode of the power supply apparatus to a non-voltage-applying mode in which the smoothed second DC voltage is not applied to a load to which the smoothed second DC voltage can be applied; and
    a protection unit that stops the first DC voltage from being input to the output unit in a case where the second DC voltage is higher than the first DC voltage,
    wherein the control unit, in a case where the detection unit detects that the power is cut off in the non-voltage-applying mode, applies the smoothed second DC voltage into the load to which the smoothed second DC voltage is not applied in the non-voltage-applying mode so as to discharge charges in the capacitor, so that a condition is maintained in which the second DC voltage is lower than the first DC voltage.

2. The power supply apparatus according to claim 1, wherein the control unit is capable of setting the mode of the power supply apparatus to a voltage-applying mode in which the smoothed second DC voltage is applied to the load to which the smoothed second DC voltage can be applied.

3. The power supply apparatus according to claim 2, wherein the detection unit comprises:
    a light emitting unit that emits light in synchronization with an AC voltage of the commercial power source; and
    a light receiving unit that receives the light emitted by the light emitting unit and outputs a pulse signal, and the detection unit detects that the power is cut off from the commercial power source when the light receiving unit does not output the pulse signal for a predetermined time or more.

4. The power supply apparatus according to claim 2, further comprising:
    a switching element that switches between conditions of applying the smoothed second DC voltage to the load to which the smoothed second DC voltage can be applied or not applying the smoothed second DC voltage to the load to which the smoothed second DC voltage can be applied,
    wherein the control unit applies the smoothed second DC voltage by means of the switching element into the load to which the smoothed second DC voltage is not applied in the non-voltage-applying mode so as to discharge charges in the capacitor in a case where the detection unit detects that the power is cut off in the non-voltage-applying mode.

5. The power supply apparatus according to claim 4, wherein the detection unit comprises:
   a light emitting unit that emits light in synchronization with an AC voltage of the commercial power source; and
   a light receiving unit that receives the light emitted by the light emitting unit and outputs a pulse signal, and the detection unit detects that the power is cut off from the commercial power source when the light receiving unit does not output the pulse signal for a predetermined time or more.

6. The power supply apparatus according to claim 1, wherein the load to which the smoothed second voltage can be applied is a resistor that is connected between the capacitor and a ground.

7. The power supply apparatus according to claim 6, wherein the detection unit comprises:
   a light emitting unit that emits light in synchronization with an AC voltage of the commercial power source; and
   a light receiving unit that receives the light emitted by the light emitting unit and outputs a pulse signal, and the detection unit detects that the power is cut off from the commercial power source when the light receiving unit does not output the pulse signal for a predetermined time or more.

8. The power supply apparatus according to claim 6, further comprising:
   a switching element connected to the resistor in series and capable of switching between an on-state and an off-state,
   wherein the control unit switches the switching element to the on-state in a case where the detection unit detects that the power is cut off in the non-voltage-applying mode.

9. The power supply apparatus according to claim 8, wherein the detection unit comprises:
   a light emitting unit that emits light in synchronization with an AC voltage of the commercial power source; and
   a light receiving unit that receives the light emitted by the light emitting unit and outputs a pulse signal, and the detection unit detects that the power is cut off from the commercial power source when the light receiving unit does not output the pulse signal for a predetermined time or more.

10. The power supply apparatus according to claim 8, wherein the switching element is a switching element that is normally in the on-state.

11. The power supply apparatus according to claim 10, wherein the detection unit comprises:
   a light emitting unit that emits light in synchronization with an AC voltage of the commercial power source; and
   a light receiving unit that receives the light emitted by the light emitting unit and outputs a pulse signal, and the detection unit detects that the power is cut off from the commercial power source when the light receiving unit does not output the pulse signal for a predetermined time or more.

12. The power supply apparatus according to claim 1, further comprising:
   an second output unit that converts a third DC voltage higher than the first DC voltage into the first DC voltage to output the first DC voltage,
   wherein the output unit includes a non-insulation type output unit and the output unit includes an insulation type output unit.

13. The power supply apparatus according to claim 1, wherein the detection unit comprises:
   a light emitting unit that emits light in synchronization with an AC voltage of the commercial power source; and
   a light receiving unit that receives the light emitted by the light emitting unit and outputs a pulse signal, wherein the detection unit detects that the power is cut off from the commercial power source when the light receiving unit does not output the pulse signal for a predetermined time or more.

14. The power supply apparatus according to claim 13, wherein the detection unit comprises a capacitor that removes a normal-mode noise, and a resistor that discharges a charge accumulated in the capacitor used to remove the normal-mode noise, the light emitting unit is connected to the resistor that discharges the charge accumulated in the capacitor used to remove the normal-mode noise, and the light emitting unit discharges the capacitor used to remove the normal-mode noise.

15. An image forming apparatus comprising:
   an image forming section that forms an image;
   an image formation control unit that controls an operation of the image forming apparatus; and
   a power supply that supplies a power to the image formation control unit, the power supply comprising:
   an output unit that converts a first DC voltage input into a second DC voltage lower than the first DC voltage, and outputs the second DC voltage;
   a capacitor that smoothes the second DC voltage as a smoothed second DC voltage;
   a detection unit that detects that a power is cut off from a commercial power source; and
   a control unit that is capable of setting a mode of the power supply to a non-voltage-applying mode in which the smoothed second DC voltage is not applied to a load to which the smoothed second DC voltage can be applied,
   a protection unit that stops the first DC voltage from being input to the output unit in a case where the second DC voltage is higher than the first DC voltage,
   wherein the control unit, in a case where the detection unit detects that the power is cut off in the non-voltage-applying mode, applies the smoothed second DC voltage into the load to which the smoothed second DC voltage is not applied in the non-voltage-applying mode so as to discharge charges in the capacitor, so that a condition is maintained in which a voltage regarding the second DC voltage is lower than a voltage regarding the first DC voltage.

* * * * *